United States Patent
Kubota et al.

(10) Patent No.: US 10,118,623 B2
(45) Date of Patent: Nov. 6, 2018

(54) ROUTE GUIDANCE APPARATUS AND ROUTE GUIDANCE METHOD

(71) Applicant: Honda Motor Co., Ltd., Tokyo (JP)

(72) Inventors: Daisuke Kubota, Saitama (JP); Haruhiko Nishiguchi, Saitama (JP); Satoshi Fujii, Saitama (JP); Ryohsaku Arakawa, Saitama (JP); Kei Oshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 15/593,328

(22) Filed: May 12, 2017

(65) Prior Publication Data

US 2017/0341653 A1    Nov. 30, 2017

(30) Foreign Application Priority Data

May 26, 2016 (JP) ................. 2016-105240

(51) Int. Cl.
| | |
|---|---|
| *G01C 22/00* | (2006.01) |
| *B60W 30/18* | (2012.01) |
| *G01C 21/36* | (2006.01) |
| *B60W 50/00* | (2006.01) |
| *B62D 15/02* | (2006.01) |
| *G06K 9/00* | (2006.01) |

(52) U.S. Cl.
CPC ......... *B60W 30/18163* (2013.01); *B60W 30/18154* (2013.01); *B60W 50/0097* (2013.01);
(Continued)

(58) Field of Classification Search
CPC ....... B60W 30/18163; B60W 50/0097; B60W 30/18154; B60W 2550/14;
(Continued)

(56) References Cited

U.S. PATENT DOCUMENTS

2005/0256630 A1* 11/2005 Nishira ............ B60K 31/0008
                                                                701/96
2006/0031008 A1*  2/2006 Kimura ............ G01C 21/3655
                                                                701/437
(Continued)

FOREIGN PATENT DOCUMENTS

| JP | H11102157 | 4/1999 |
|---|---|---|
| JP | 2006023278 | 1/2006 |

(Continued)

OTHER PUBLICATIONS

"Office Action of Japan Counterpart Application," with machine English translation thereof, dated Feb. 6, 2018, p. 1-p. 7.

*Primary Examiner* — Shardul D Patel
(74) *Attorney, Agent, or Firm* — JCIPRNET

(57) ABSTRACT

Provided is a route guidance apparatus and a route guidance method which are capable of appropriately performing route guidance on a road where a plurality of lanes exist on one side. The route guidance apparatus 12 or the route guidance method determines the timing of the automated or manual lane change based on the total required distance Dlcttl corresponding to the number of required lane changes Nlcn required for reaching the target lane 502*tar* from the current lane 502*cur*, and the remaining distance to the planned course change point Prc from the current position Pcur. When the timing of the lane change is reached, the timing of the automated lane change or the manual lane change is guided, or the automated lane change is performed.

13 Claims, 9 Drawing Sheets

(52) U.S. Cl.
CPC ..... *B62D 15/0255* (2013.01); *G01C 21/3655* (2013.01); *G01C 21/3658* (2013.01); *B60W 2420/42* (2013.01); *B60W 2550/14* (2013.01); *B60W 2550/402* (2013.01); *G01C 21/3629* (2013.01); *G06K 9/00798* (2013.01)

(58) Field of Classification Search
CPC ........ B60W 2420/42; B60W 2550/402; B62D 15/0255; G01C 21/3655; G01C 21/3658; G01C 21/3629; G06K 9/00798
USPC ........................ 701/23, 25, 26, 400; 340/903
See application file for complete search history.

(56) References Cited

U.S. PATENT DOCUMENTS

| | | | | |
|---|---|---|---|---|
| 2009/0032681 | A1* | 2/2009 | Lu | H01L 31/02325 250/208.1 |
| 2012/0310465 | A1* | 12/2012 | Boatright | B60Q 1/346 701/25 |
| 2013/0184926 | A1* | 7/2013 | Spero | B62D 1/28 701/26 |
| 2014/0067250 | A1* | 3/2014 | Bone | G08G 1/167 701/301 |
| 2014/0074356 | A1* | 3/2014 | Bone | G08G 1/167 701/41 |
| 2014/0207325 | A1* | 7/2014 | Mudalige | B62D 15/025 701/26 |
| 2017/0248959 | A1* | 8/2017 | Matsubara | G05D 1/0088 |
| 2017/0305465 | A1* | 10/2017 | Mielenz | B60W 30/18145 |
| 2018/0099676 | A1* | 4/2018 | Goto | B60W 30/10 |

FOREIGN PATENT DOCUMENTS

| | | |
|---|---|---|
| JP | 2006184007 | 7/2006 |
| JP | 2008290680 | 12/2008 |
| JP | 2010107386 | 5/2010 |
| JP | 2015011458 | 1/2015 |

* cited by examiner

| The number of lanes NIn | Lane mark information Dashed line: 0, Solid line: 1 | | The number of lane changes with reference to acceleration lane *Left: +1, Right: -1 | Lane attribute PIn | Point in FIG. 6 |
|---|---|---|---|---|---|
| | Left side | Right side | | | |
| 1 | 1 | 1 | 1 | 1 | |
| 2 | 1 | 0 | 2 | 2 | |
| | 0 | 1 | 1 | 1 | |
| 3 | 1 | 0 | 3 | 3 | |
| | 0 | 0 | 2 | 2 | |
| | 0 | 1 | 1 | 1 | |
| 4 | 1 | 0 | 4 | 4 | |
| | 0 | 0 | 3 | 3 | P24 |
| | 0 | 0 | 2 | 2 | P23, P25 |
| | 0 | 1 | 1 | 1 | P22 |

FIG. 7

ROUTE GUIDANCE APPARATUS AND ROUTE GUIDANCE METHOD

CROSS-REFERENCE TO RELATED APPLICATION

This application claims the priority benefit of Japan application serial no. 2016-105240, filed on May 26, 2016. The entirety of the above-mentioned patent application is hereby incorporated by reference herein and made a part of this specification.

BACKGROUND OF THE INVENTION

Field of the Invention

The invention relates to a route guidance apparatus and a route guidance method that navigates a route of a vehicle to a destination for manual driving or automated driving.

Description of Related Art

Patent Literature 1 aims at providing an automated driving apparatus for vehicle that is capable of smoothly operating transition from automated driving to manual driving while simplifying the facility (paragraph [0004] and abstract).

To achieve the purpose, in Patent Literature 1 (abstract), an automated driving ECU 2 of an automated driving device 1 has an express highway setting part 10 for setting an express highway section where a vehicle should travel among all routes to the destination by using road map information stored in a map database 16, an evacuation area setting part 11 for setting a PA (final PA) just before an exit IC in the express highway section as an evacuation area, an automated driving relay spot setting part 12 for setting a spot before the final PA in the express highway section as a relay spot for starting relay from automated driving to manual driving, and an automated driving operation control part 15 for controlling the vehicle to perform automated driving with the evacuation area as the destination when an automated driving switch 5 is switched on.

Also, in Patent Literature 1, the own vehicle A is forcibly stopped in the evacuation area B (final PA) if the driver falls asleep (paragraphs [0028] and [0029]).

Patent Literature 2 aims at setting an arbitrary location as a destination of an automated driving control and finishing automated driving at the most preferable location conforming the actual shape or structure of each interchange (paragraph [0007]).

To achieve the purpose, the automated travelling control system of Patent Literature 2 (abstract) includes a computerized road information reproducing means that reproduces computerized road information, a position detecting means that detects the position of the own vehicle, a planned travelling route setting means that sets the planned travelling route of the own vehicle to the destination specified based on the reproduced computerized road information, and an automated driving control means that controls automated driving along the set planned travelling route. The automated driving control system further includes a control point setting means that sets an entrance point for entering the automated travelling control and an exit point for exiting the automated travelling control.

Patent Literature 2 can set an interchange A on the express highway as a destination or a departure point (paragraph [0016] and FIG. 4). Also, Patent Literature 2 mentions technology that performs guidance by audio output of a message, etc. at a location before a point at which course change is required such as an intersection (paragraph [0002]).

PRIOR ART LITERATURE

Patent Literature

Patent Literature 1: Japanese Unexamined Patent Publication No. 2008-290680.
Patent Literature 2: Japanese Unexamined Patent Publication No. H11-102157.

As mentioned above, in Patent Literature 1, the own vehicle A is forcibly stopped in the evacuation area B (final PA) if the driver falls asleep (paragraphs [0028] and [0029]). The express highway is normally constituted with multiple lanes on one side, and Patent Literature 1 does not consider how to make the own vehicle A change the lane when there are multiple lanes on the side.

Similarly, in Patent Literature 2, the setting of the destination or the departure point is disclosed (paragraph [0016] and FIG. 4), but it does not consider how to make the vehicle change the lane under automated driving. Patent Literature 2 mentions technology that performs guidance by audio output of a message, etc. at a location before a point at which course change is required such as an intersection (paragraph [0002]). However, it does not consider how to perform such guidance when there are multiple lanes constituting one side.

SUMMARY OF THE INVENTION

The disclosure provides a route guidance apparatus and a route guidance method that are capable of appropriately performing route guidance on a road that has multiple lanes on one side.

A route guidance apparatus according to the disclosure navigates a route of a vehicle to a destination for manual driving or automated driving, and includes: a current lane detection part that detects the current lane on which the vehicle is travelling on the first road where multiple lanes exist on one side; a target lane calculation part that calculates the target lane on which the vehicle should be travelling at a planned course change point that is a branch point where the vehicle is planned to change the course; a total required distance calculation part that calculates the total required distance corresponding to the number of required lane changes required for reaching the target lane from the current lane; a remaining distance calculation part that calculates the remaining distance to the planned course change point from the current position of the vehicle; a timing determination part that determines the timing of an automated or manual lane change based on the total required distance and the remaining distance; and a lane change support part that guides the timing of the automated or manual lane change or performs the automated lane change when the timing of the lane change is reached.

According to the disclosure, the timing of the automated or manual lane change is determined based on the total required distance corresponding to the number of required lane changes from the current lane to the target lane and a remaining distance to the planned course change point from the current position. Then, when the timing of the lane change is reached, the timing of the automated or manual lane change is guided or the automated lane change is performed.

Thereby, the timing of the automated or manual lane change is guided or the automated lane change is performed at the timing calculated back from the total required distance. Accordingly, it is possible to travel with relatively a few restrictions compared to the case where the vehicle is guided to travel on the target lane from the beginning under the manual driving or the case where it is automatically driven to travel on the target lane from the beginning, for example. Therefore, it is possible to improve the degree of freedom under travelling of the vehicle and to appropriately perform the route guidance.

Also, if the timing of the automated or manual lane change is not guided totally under the manual driving, it may not be able to smoothly travel when the driver tries to move to the target lane right before reaching the planned course change point. According to the disclosure, the driver can smoothly reach the target lane before reaching the planned course change point by the guidance of the timing of the lane change.

The current lane detection part may obtain the number of lanes of the first road corresponding to the current position from a map information database. Also, the current lane detection part may specify the current lane by counting the number of lane changes after entering the first road. Thereby, it is possible to specify the current lane even it cannot be detected which lane the vehicle is travelling on based on the current position because of relatively low detection accuracy of the current position.

The current lane detection part may detect a lane mark based on the front image of the vehicle captured by a front camera. Also, the current lane detection part may count the number of lane changes after entering the first road based on the direction on which the vehicle crosses the lane mark and the number of times the vehicle crosses the lane mark. Thereby, it is possible to specify the current lane with relatively high accuracy by using the front image even it cannot be detected which lane the vehicle is travelling on based on the current position because of relatively low detection accuracy of the current position.

The current lane detection part may set the initial value of the current lane on the first road when the lane mark of the solid line on either the left or right side of the vehicle and the lane mark of the dashed line on the other side are detected. Thereby, it is possible to determine the start point of the first road in a relatively simple way.

The remaining distance calculation part may set the planned course change point at an exit of the first road in an interchange where the vehicle should get off; a junction or a branch where the first road is divided into multiple roads or an intersection where the vehicle should make a turn.

Thereby, it is possible to smoothly perform prerequisite lane changes when the vehicle changes the lane in the interchange, the junction, the branch or the intersection.

The remaining distance calculation part may correct the planned course change point to the near side by using traffic congestion distance information at the planned course change point obtained from the outside through a communication apparatus. Thereby, even there is traffic congestion at the planned course change point, it makes easier to perform the lane change to the target lane in accordance with the traffic congestion.

A route guidance method according to the disclosure navigates a route of a vehicle to a destination by using a route guidance apparatus, and performs: a current lane detection step for detecting the current lane on which the vehicle is travelling on the first road where multiple lanes exist on one side; a target lane calculation step for calculating a target lane on which the vehicle should be travelling at a planned course change point that is a branch point where the vehicle is required to change the course; a total required distance calculation step for calculating the total required distance corresponding to the number of required lane changes required for reaching the target lane from the current lane; a remaining distance calculation step for calculating the remaining distance from the current position of the vehicle to the planned course change point; a timing determination step for determining the timing of an automated or manual lane change based on the total required distance and the remaining distance; and a lane change support step for guiding the timing of the automated or manual lane change or performing the automated lane change when the timing of lane change is reached.

According to the disclosure, it is possible to appropriately perform the route guidance on the road where multiple lanes exist on one side.

BRIEF DESCRIPTION OF THE DRAWINGS

FIG. 7 is an explanatory diagram of the relationship between the lane attribute and other information in the embodiment.

DESCRIPTION OF THE EMBODIMENTS

A. Embodiment

A-1. Configuration

A-1-1. Overall Configuration

Figure 1:
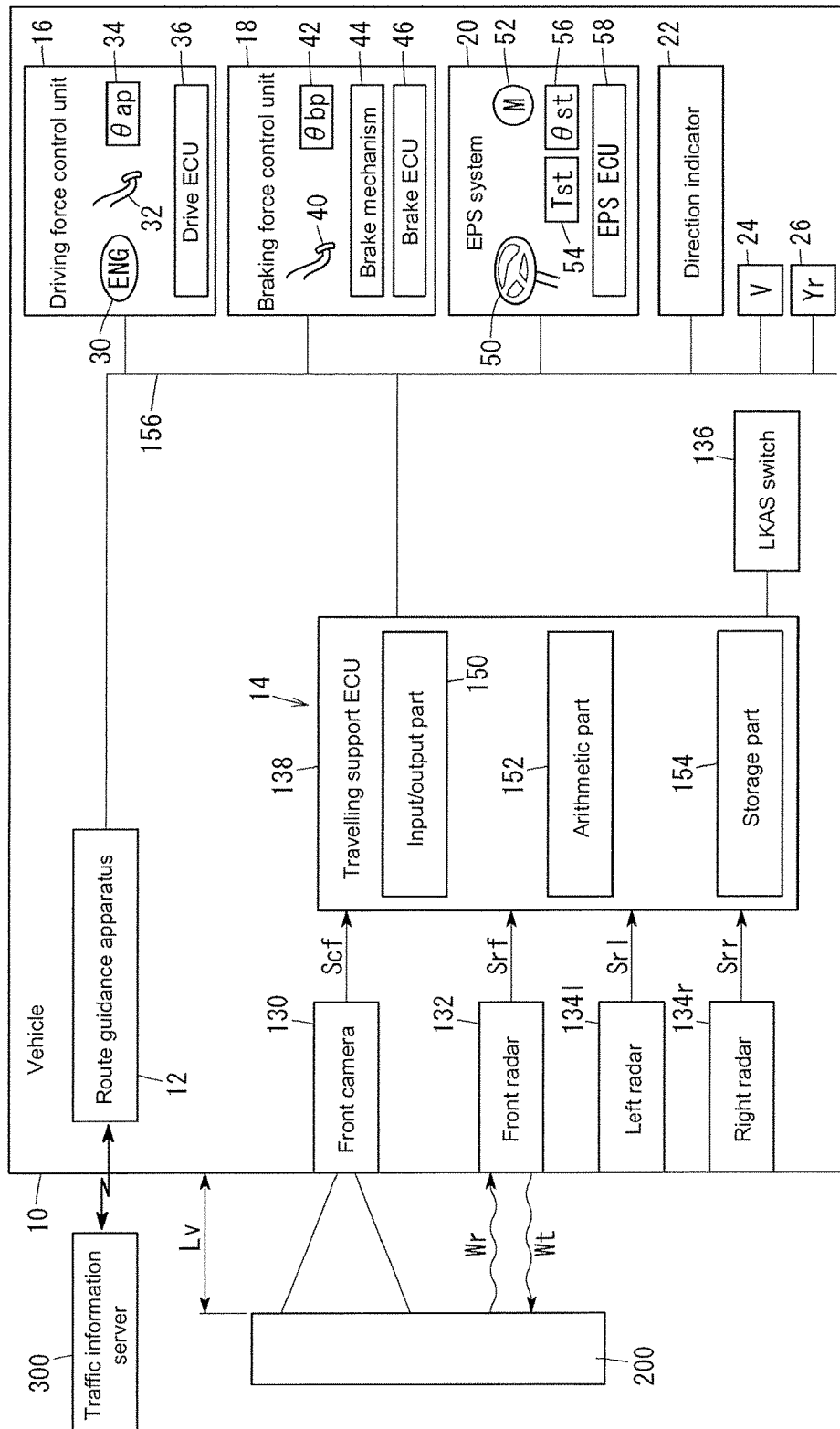
FIG. 1 is a block diagram illustrating a configuration of a vehicle including a route guidance apparatus according to an embodiment of the disclosure.

FIG. 1 is a block diagram illustrating a configuration of a vehicle 10 including a route guidance apparatus 12 according to an embodiment of the disclosure. In FIG. 1, a traffic information server 300 is illustrated in addition to the vehicle 10 (hereinafter also referred to as "own vehicle 10"). The vehicle 10 has a travelling support apparatus 14, a driving force control system 16, a braking force control system 18, an electric power steering system 20 (hereinafter referred to as "EPS system 20"), a direction indicator 22, a vehicle speed sensor 24 and a yaw rate sensor 26, in addition to the route guidance apparatus 12.

The route guidance apparatus 12 performs route guidance according to a planned route Rv (hereinafter also referred to as "route Rv") of the own vehicle 10 to a destination Pgoal (hereinafter also referred to as "final destination Pgoal") for manual driving or automated driving. The route guidance apparatus 12 according to the embodiment guides the timing of lane change.

Figure 3:
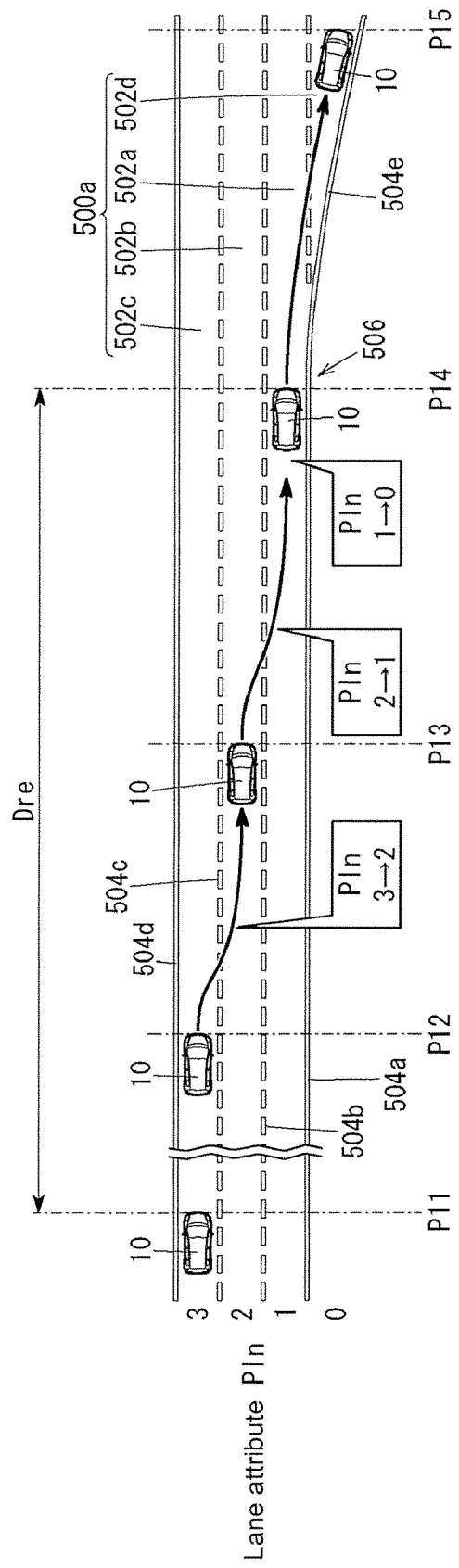
FIG. 3 is a diagram for describing the timing of lane change guidance of the lane change guidance control of the embodiment and the move of the vehicle corresponding thereto.

The travelling support apparatus 14 detects various types of surrounding objects 200 appearing around the own vehicle 10 (for example, surrounding vehicles, pedestrians and walls, which are not depicted) and lane marks (such as lane marks 504a to 504d in FIG. 3). The travelling support apparatus 14 supports travel of the own vehicle 10 by using the surrounding objects 200 and lane marks 504.

The driving force control system 16 has an engine 30 (driving source), an accelerator pedal 32, an accelerator pedal operation amount sensor 34 (hereinafter also referred to as "AP sensor 34"), and an electronic drive control unit 34 (hereinafter referred to as "drive ECU 36"). The AP sensor 34 detects the operation amount θap (hereinafter also referred to as "AP operation amount θap" or "operation amount θap") [%] of the accelerator pedal 32.

The drive ECU 36 operates the driving force control of the vehicle 10 by using the operation amount θap, etc. During the driving force control, the drive ECU 36 controls the driving force of the vehicle 10 through controlling the engine 30. The driving force control of this embodiment includes the adaptive cruise control (ACC). The adaptive cruise control runs the own vehicle 10 at a vehicle speed V [km/h] matching a target vehicle speed Vtar, and to keep a distance to a preceding vehicle at a target distance corresponding to the vehicle speed V when there is the precedent vehicle on the same lane as the own vehicle 10.

The braking force control system 18 has a brake pedal 40, a brake pedal operation amount sensor 42 (hereinafter also referred to as "BP sensor 42"), a brake mechanism 44 and an electronic brake control unit 46 (hereinafter referred to as "brake ECU 46"). The BP sensor 42 detects the operation amount θbp (hereinafter also referred to as "BP operation amount θbp" or "operation amount θbp") [%] of the brake pedal 40.

The brake ECU 46 performs the braking force control of the vehicle 10 by using the operation amount θbp, etc. During the braking force control, the brake ECU 46 controls the braking force of the vehicle 10 through controlling the brake mechanism 44, etc.

The EPS system 20 has a steering wheel 50, an EPS motor 52, a torque sensor 54, a steering angle sensor 56, and an electronic EPS control unit 58 (hereinafter referred to as "EPS ECU 58" or "ECU 58"). The EPS motor 52 is connected to any part between the steering wheel 50 and a wheel, which is not depicted, and applies steering assist force. The torque sensor 54 detects a torque Tst (hereinafter also referred to as "steering torque Tst") to the steering wheel 50 from the driver. The steering angle sensor 56 detects a steering angle θst of the steering wheel 50.

The EPS ECU 58 performs the steering assist control for assisting steering of the driver by generating steering assist force according to the steering torque Tst, etc.

The direction indicator 22 is a switch (blinker switch) disposed around the steering wheel 50, and blinks the blinker lamp on the left side (left-turn direction) or the right side (right-turn direction) based on the operation of the driver. The vehicle speed sensor 24 detects the vehicle speed V of the vehicle 10 and outputs it to the travelling support apparatus 14, etc. The yaw rate sensor 26 detects a yaw rate Yr of the vehicle 10 and outputs it to the travelling support apparatus 14, etc.

A-1-2. Route Guidance Apparatus 12

Figure 2:
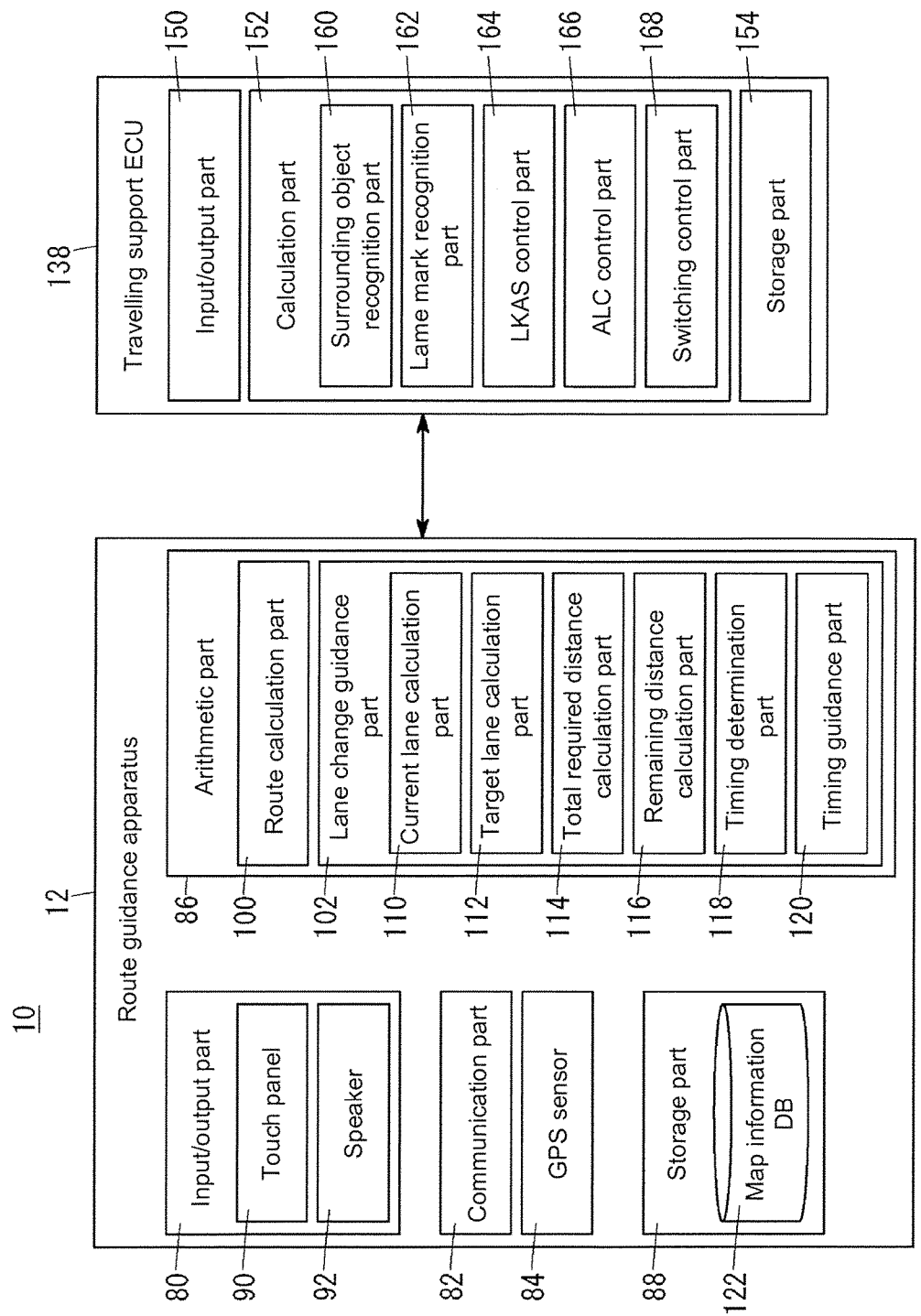
FIG. 2 is a block diagram illustrating the details of the configuration of the route guidance apparatus according to the embodiment and the surroundings thereof.

FIG. 2 is a block diagram illustrating the details of the configuration of the route guidance apparatus 12 according to this embodiment and the surroundings thereof. The route guidance apparatus 12 navigates a route Rv to the destination Ptar of the vehicle 10. In this embodiment, the destination Ptar is intended to be the final destination, but the destination Ptar may be an intermediate destination.

As shown in FIG. 2, the route guidance apparatus 12 has an input/output part 80, a communication part 82, a global positioning system sensor 84 (hereinafter referred to as "GPS sensor 84"), an arithmetic part 86, and a storage part 88. The input/output part 80 performs input/output of a signal between the route guidance apparatus 12 and other parts, and includes an operation input/output device (HMI: Human-Machine Interface) for an occupant (including the driver). The input/output part 80 of this embodiment includes a touch panel 90 and a speaker 92.

The communication part 82 (communication device) performs wireless communication with external equipment. The external equipment here includes the traffic information server 300 (refer to FIG. 1), for example. The traffic information server 300 provides traffic information such as a traffic congestion information Ijam, accident information, construction information (may include information of a future construction) to the route guidance apparatus 12 in each vehicle 10. Alternatively, the external equipment may include a route guidance server. The route guidance server generates or calculates the route Rv instead of the route guidance apparatus 12 based on a current position Pcur of the vehicle 10 received from the route guidance apparatus 12 and the destination Ptar.

The GPS sensor 84 (current position detection part) detects the current position Pcur of the vehicle 10.

The arithmetic part 86 controls the entire route guidance apparatus 12 by executing programs stored in the storage part 88, and includes a central processing unit (CPU), for example. As shown in FIG. 2, the arithmetic part 86 includes a route calculation part 100 and a lane change guidance part 102.

The route calculation part 100 generates or calculates the route Rv to the destination Ptar automatically or by an operation of the occupant (includes the driver). That is, the route calculation part 100 generates a new route Rv to the destination Ptar when the course of the vehicle 10 deviates from the planned route Rv. Also, the route calculation part 100 generates a new route Rv to a new destination Ptar when the new destination Ptar is set by the occupant through the input/output part 80.

The lane change guidance part 102 performs most of a lane change guidance control that guides the timing of lane change. As shown in. FIG. 2, the lane change guidance part 102 includes a current lane calculation part 110, a target lane calculation part 112, a total required distance calculation part 114, a remaining distance calculation part 116, a timing determination part 118 and a timing guidance part 120.

The current lane calculation part 110 (current lane detection part) detects a lane (current lane) on which the own vehicle 10 is travelling on a road (express highway 500a of FIG. 3, etc.) where multiple lanes (lanes 502a to 502d in FIG. 3, etc.) exist on one side.

The target lane calculation part 112 calculates a lane (target lane) on which the vehicle 10 should be travelling at the planned course change point Prc (temporary destination) which is a branch point where the vehicle 10 needs to change the course.

The total required distance calculation part 114 calculates a total required distance Dlcttl corresponding to the number of required lane changes Nlcn required for reaching the target lane from the current lane.

The remaining distance calculation part 116 calculates a remaining distance Dre to the planned course change point Prc from the current position Pcur. The planned course change point Prc is set to, for example, an interchange where the vehicle 10 should get off, a branch or a junction where the express highway 500a etc. (first road) is divided into multiple roads, or an intersection where the vehicle 10 makes a turn.

The timing determination part 118 determines the timing of the automated or manual lane change based on the total required distance Dlcttl and the remaining distance Dre.

The timing guidance part 120 (lane change support part) guides the timing of the automated or manual lane change when the timing of the lane change is reached.

The storage part 88 (refer to FIG. 2) stores programs and data (including a map information database 122) used by the arithmetic part 86. The map information database 122 (hereinafter also referred to as "map information DB 122" or "map DB 122") stores information of the road map (a map information Imap). The storage part 88 includes, for example, a random access memory (hereinafter referred to as "RAM"). A volatile memory such as a register and a nonvolatile memory such as a flash memory can be used as the RAM. Also, the storage part 88 may have a read-only memory (hereinafter referred to as "ROM") in addition to the RAM.

In this embodiment, the route guidance apparatus 12 is intended to be mounted (or constantly fixed) on the vehicle 10. However, the route guidance apparatus 12 may be portable to outside, like a smartphone. Also, it is possible to make external equipment existing outside the vehicle 10 bear a part of the functions of the route guidance apparatus 12. For example, a configuration that the vehicle 10 itself does not have the route calculation part 100 and/or the map information DB 122 and that the route Rv and/or the map information Imap are obtained from the route guidance server is possible.

A-1-3. Travelling Support Apparatus 14

As shown in FIG. 1, the travelling support apparatus 14 has a front camera 130, a front radar 132, side radars 134*l* and 134*r*, a LKAS (Lane Keeping Assist System) switch 136 and an electronic travelling support control unit 138 (hereinafter referred to as "travelling support EUC 138" or "ECU 138").

A-1-3-1. Front Camera 130

The front camera 130 (hereinafter also referred to as "camera 130") as an imaging part obtains an image Icf (hereinafter also referred to as "front image Icf") in front of the vehicle 10. Then, the front camera 130 outputs a signal corresponding to the image Icf (hereinafter referred to as "image signal Scf" or "signal Scf") to the ECU 138. The signal Scf includes information Ic (hereinafter also referred to as "camera information Ic") obtained by the camera 130. Detected objects 200 detected by the camera 130 are hereinafter referred to as "camera targets 200*c*".

A single front camera 130 is used in this embodiment, but it is possible to constitute a stereo camera by symmetrically disposing two front cameras. The front camera 130 captures the image Icf at more than 15 frames per second (30 frames, for example). The front camera 130 is a monochrome camera mainly utilizing light having the wavelength of the visible light region, but the front camera may be a color camera or an infrared camera. The front camera 130 is disposed, for example, in the central part in the vehicle width direction in the front part inside the vehicle compartment of the vehicle 10 (around the rearview mirror, for example). Alternatively, the front camera may be disposed in the central part in the vehicle width direction in the front bumper part of the vehicle 10.

A-1-3-2. Front Radar 132 and Side Radars 134*l* and 134*r*

The front radar 132 and the side radars 134*l* and 134*r* (hereinafter also referred to as "radars 132, 134*l* and 134*r*") outputs transmission waves Wt that is electromagnetic waves (millimeter waves here) toward the outside of the vehicle 10 and receives reflected waves Wr that is the transmission waves Wt reflected by the detected objects 200 (including surrounding vehicles and pedestrians, for example). Then, the radars 132, 134*l* and 134*r* outputs detection signal (hereinafter referred to as "reflected wave signals Srf, Srl and Srr" or "signals Srf, Srl and Srr") corresponding to the reflected waves Wr to the ECU 138. The signals Srf, Srl and Srr include information Ir (hereinafter also referred to as "radar information Ir") that the radars 132, 134*l* and 134*r* obtained.

The detected objects 200 detected by the radars 132, 134*l* and 134*r* are hereinafter also referred to as "radar targets 200*r*". The side radar 134*l* is also called a left radar 134*l*, and the side radar 134*r* is also called a right radar 134*r*.

The front radar 132 is disposed on the front side of the vehicle 10 (the front bumper and/or the front grille, for example). The side radars 134*l* and 134*r* are disposed on the sides of the vehicle 10 (the sides of the front bumper, for example). In addition to these, another radar may be disposed on the rear side of the vehicle 10 (the rear bumper and/or the rear grille, for example). Instead of the radar 132 outputting the millimeter waves, a sensor such as a laser sensor and an ultrasonic wave sensor can be used. In addition to or instead of the side radars 134*l* and 134*r*, side cameras on the left and right may be disposed.

A distance Lv (refer to FIG. 1) to each of the detected objects 200 and the type of each of the detected objects 200, etc. can be determined by using at least any one of the camera targets 200*c* detected by the front camera 130 and the radar targets 200*r* detected by the radars 132, 134*l* and 134*r*.

A-1-3-3. LKAS Switch 136

The LKAS switch 136 is a switch used by the driver to instruct the lane keeping assist system control (LKAS control), which is described later. In addition to or instead of the LKAS switch 136, it is possible to instruct the LKAS control by other methods (voice input through a microphone, which is not depicted, etc.).

A-1-3-4. Travelling Support ECU 138

The travelling support ECU 138 is for controlling the entire travelling support apparatus 14 and has an input/output part 150, an arithmetic part 152 and a storage part 154, as shown in FIG. 2.

The image signal Scf from the camera 130 and the reflection wave signals Srf, Srl and Srr from the radars 132, 134*l* and 134*r* are provided to the travelling support ECU 138 through the input/output part 150. Also, the communication between the travelling support ECU 138 and the drive ECU 36, the brake ECU 46 and EPS ECU 58 is performed through the input/output part 150 and a communication line 156 (refer to FIG. 1). The input/output part 150 has an A/D conversion circuit (not depicted) that converts the input analog signal to the digital signal.

The arithmetic part 152 performs arithmetic operations based on signals from various sensors, the route guidance apparatus 12 and each of the ECUs 36, 46 and 58, etc. Then, the arithmetic part 152 generates signals for the drive ECU 36, the brake ECU 46 and EPS ECU 58 based on arithmetic operation results. The various sensors here include the direction indicator 22, the vehicle speed sensor 24, the yaw rate sensor 26, the AP sensor 34, the BP sensor 42, the torque sensor 54, the steering angle sensor 56, the camera 130 and the radars 132, 134*l* and 134*r*.

As shown in FIG. 2, the arithmetic part 152 has a surrounding object recognition part 160, a lane mark recognition part 162, a LKAS control part 164, an ALC (Automated Lane Change) control part 166 and a switching control part 168. Each of these parts is realized by executing a program stored in the storage part 154. The program may be provided from the outside through a wireless communication device (a mobile phone, a smartphone, etc.) that is not depicted. A part of the program may be constituted with hardware (circuit parts).

The surrounding object recognition part 160 recognizes the surrounding objects 200 based on the camera information Ic from the camera 130 and the radar information Ir from the radars 132, 134*l* and 134*r*, and outputs information Iao (hereinafter also referred to as "surrounding object information Iao") regarding the surrounding objects 200.

The lane mark recognition part 162 recognizes the lane marks (lane marks 504*a* to 504*d* in FIG. 3, etc.) based on the camera information Ic (surrounding image Ica) from the camera 130, and outputs information Ilm (hereinafter also referred to as "lane mark information Ilm") regarding the lane marks. The lane mark recognition part 162 may be constituted as a part of the surrounding object recognition part 160.

The LKAS control part 164 performs the lane keeping assist system control (LKAS control) of the vehicle 10 based on the surrounding object information Iao from the surrounding object recognition part 160 and the lane mark information Ilm from the lane mark recognition part 162.

In the LKAS control, the LKAS control part 164 calculates a torque target value (hereinafter referred to as "target LKAS torque Tlkas_tar" or "target torque Tlkas_tar") of the EPS motor 52. The target LKAS torque Tlkas_tar is torque required for keeping the vehicle 10 at a reference position Plkas_ref on the lane on which the own vehicle 10 is travelling (hereinafter also referred to as "travelling lane").

The ALC control part 166 performs the automated lane change control (ALC control) of the vehicle 10 based on the surrounding object information Iao from the surrounding object recognition part 160 and the lane mark information Ilm from the lane mark recognition part 162. In the ALC control, the target torque value (hereinafter referred to as "target ALC torque Talc_tar" or "target torque Talc_tar") of the EPS motor 52, a driving force Fd and a braking force Fb of the vehicle 10 required for the automated lane change (ALC) are calculated.

The switching control part 168 performs switching processing that switches between a manual driving mode in which the driver controls steering and acceleration/deceleration and a semi-automated driving mode (quasi-automated driving mode) in which all or a part of steering or acceleration/deceleration is automatically performed by the LKAS control and the ALC control. In other words, the switching control part 168 switches the LKAS control and the ALC control. Instead of both or either of the manual driving mode and the semi-automated driving mode, a complete automated driving mode that does not involve steering and acceleration/deceleration by the driver can be used.

The storage part 154 stores programs and data used by the arithmetic part 152, and includes a RAM. A volatile memory such as a register and a nonvolatile memory such as a flash memory can be used as the RAM. Also, the storage part 154 may have a ROM in addition to the RAM.

A-1-4. Traffic Information Server 300

The traffic information server 300 transmits traffic information to the vehicle 10 based on a request from the vehicle 10. In other words, in this embodiment, the traffic information server 300 and the communication part 82 of the vehicle 10—perform bidirectional communication. The communication between the traffic information server 300 and the communication part 82 may use unidirectional communication using a broadcast as described later.

A-2. Various Controls

A-2-1. Description of Terms

FIG. 3 is a diagram for describing the timing of lane change guidance of the lane change guidance control of this embodiment and the move of the vehicle 10 corresponding thereto. Firstly, the terms common to each control are described using FIG. 3.

FIG. 3 shows the express highway 500*a* including the three lanes 502*a*, 502*b* and 502*c* as the main stem and the lane 502*d* as the exit lane on one side. Hereinafter, an express highway 500*b* of FIG. 6 and express highways 500*c* to 500*e* of FIGS. 8A to 8C described later and the express highway 500*a* of FIG. 3 are collectively called the express highway 500.

Also, lanes 502*e* to 502*i* in FIG. 6 and lanes 502*j* to 502*r* in FIGS. 8A to 8C described later and the lanes 502*a* to 502*d* in FIG. 3 are collectively referred to as lanes 502. The lanes 502*a* to 502*c*, 502*f* to 502*i*, 502*k*, 502*m*, 502*n* and 502*p* to 502*r* are also referred to as main stem lanes 502*a* to 502*c*, 502*f* to 502*i*, 502*k*, 502*m*, 502*n* and 502*p* to 502*r*, and collectively referred to as main stem lanes 502*mn*. Further, the lane 502*d* is referred to as an exit lane 502*d*. Furthermore, the lanes 502*e*, 502*j*, 502*l* and 502*o* are also referred to as acceleration lanes 502*e*, 502*j*, 502*l* and 502*o*.

The lanes 502 mean a section where the own vehicle 10 can travel. Each of the lanes 502*a*, 502*b*, 502*c* and 502*d* in FIG. 3 is defined by the lane marks 504*a*, 504*b*, 504*c* and 504*d*. Hereinafter, lane marks 504*f* to 504*k* in FIG. 6 and lane marks 504*l* to 504*z* in FIGS. 8A to 8C described later and the lane marks 504*a* to 504*e* are collectively referred to as lane marks 504. The lanes 502 may be defined by methods other than the lane marks 504. For example, the lanes 502 may be defined based on guardrails (not depicted).

The lane on which the own vehicle 10 is travelling is also referred to as a travelling lane 502*dr* or a current lane 502cur. In FIG. 3, the lane 502c is the driving lane 502dr when the own vehicle 10 is located at P11 and P12. When the own vehicle 10 is at P13, the lane 502b is the travelling lane 502dr. When the own vehicle is at P14, the lane 502a is the travelling lane 502dr. When the own vehicle is at P15, the lane 502d is the travelling lane 502dr.

Further, FIG. 3 shows the exit 506 (from which the own vehicle 10 should get off) of the express highway 500a.

A-2-2. Overview of Various Controls

As described above, the LKAS control part 164 (refer to FIG. 2) of this embodiment performs the LKAS control. The LKAS control keeps the vehicle 10 at the reference position Plkas_ref of the travelling lane 502dr. The reference position Plkas_ref here indicates a position in the width direction of the travelling lane 502dr. A reference line (target locus) is formed by the reference positions Plkas_ref continuing on the travelling direction of the vehicle 10.

The ALC control part 166 performs the ALC control. The ALC control automatically moves the own vehicle 10 to the lane 502 on a side (the left side or the right side) with respect to the travelling lane 502dr of the own vehicle 10 specified by the direction indicator 22.

The switching control part 168 performs the switching processing which switches between the manual driving mode in which the driver controls steering and acceleration/deceleration and the semi-automated driving mode (quasi-automated driving mode) that all or a part of steering or acceleration/deceleration is automatically performed by the LKAS control and the ALC control. In the semi-automated driving mode, the LKAS control and the ALC control are selectively performed.

A-2-3. LKAS Control

The LKAS control reduces the driving load by supporting the operation of the steering 50 for driving along the reference line composed of the reference position Plkas_ref of the travelling lane 502dr. During the LKAS control, the LKAS control part 164 controls the driving force of the vehicle 10 by the engine 30 and the braking force of each driving wheels by the brake mechanism 44, and also controls the steering angle θst of the steering wheel 50 through the EPS motor 52.

That is, the LKAS control part 164 outputs the command of the steering angle θst to the EPS EUC 58 so as to make the vehicle 10 travel on the reference position Plkas_ref of the travelling lane 502dr. The target LKAS torque Tlkas_tar is used for the control of the steering angle θst for the LKAS control. In addition, the LKAS control 164 may output the operation command of the engine 30 to the drive ECU 36 and the operation command of the brake mechanism 44 to the brake ECU 46 to deal with travelling on the curved road, etc.

The reference position Plkas_ref in this embodiment is a point on the central line of the travelling lane 502dr. Alternatively, the reference position Plkas_ref may be a point shifted by a predetermined distance from the central line in the width direction.

A-2-4. ALC Control

The ALC control automatically moves the own vehicle 10 to the lane 502 on a side (the left side or the right side) with respect to the travelling lane 502dr of the own vehicle 10 specified by the direction indicator 22. During the ALC control, the ALC control part 166 controls the driving force of the vehicle 10 through the drive ECU 36, and also controls the steering angle θst through the EPS ECU 58. The target ALC torque Talc_tar is used for the control of the steering angle θst for the ALC control.

A-2-5. Lane Change Guidance Control

A-2-5-1. Overview of Lane Change Guidance Control

As described above, the lane change guidance control part 102 of the route guidance apparatus 12 of this embodiment performs the lane change guidance control. The lane change guidance control guides the timing of ALC for the course change. The lane change guidance control may guide the timing of the manual lane change for the course change. The "course change" here means that, for example, the vehicle 10 moves to another road according to a branch of the road (for example, moving from the main stem (the lanes 502a to 502c) of the express highway 500a to the exit lane 502d).

FIG. 3 is a diagram for describing the timing of the lane change guidance of the lane change guidance control of this embodiment and the move of the vehicle 10 corresponding thereto. In FIG. 3, the own vehicle 10 is travelling on the express highway 500a including the three lanes 502a, 502b and 502c on one side. Specifically, the own vehicle 10 is travelling on the left-most lane 502c of the express highway 500a in the beginning.

In FIG. 3, the lane change guidance is provided to the driver by the route guidance apparatus 12 of the own vehicle 10 because a distance Dre (hereinafter also referred to as "remaining distance Dre") from the own vehicle 10 to the exit 506 of the express highway 500a (which the own vehicle 10 should get off) becomes less than or equal to a distance threshold value THdre. The lane change guidance includes audio guidance through the speaker 92 and display guidance through the touch panel 90. Alternatively, the lane change guidance may include either one of the audio guidance and the display guidance.

Also, the distance threshold value THdre is set as a distance sufficient for the driver to perform the lane change of the vehicle 10 from the travelling lane 502dr at the moment (the left-most lane 502c at the position P11 in FIG. 3) to the lane 502 (the right-most lane 502a in FIG. 3) closest to the exit 506 (or the exit lane 502d).

The exit 506 is a kind of the planned course change point Prc which is a branch point where the vehicle 10 needs to change the course. Hereinafter, the lane 502 on which the vehicle 10 should be travelling at the planned course change point Prc is referred to as a target lane 502tar. In FIG. 3, the target lane 502tar is the lane 502a closest to the exit 506 (or the exit lane 502d).

The driver who received the lane change guidance performs the lane change to the target lane 502tar. That is, the vehicle 10 is travelling on the left-most lane 502c at the point P11 where the driver received the lane change guidance, and then the driver moves the vehicle 10 from the left-most lane 502c to the lane 502b in the center (the second from the left) (point P13).

The LKAS control is being executed in the example of FIG. 3. Therefore, when the driver operates the direction indicator 22, the ALC control is executed. That is, when the driver operates the direction indicator 22 to the right-turn direction while the own vehicle 10 is travelling on the left-most lane 502c, the ALC control part 166 moves the own vehicle 10 from the lane 502c to the lane 502b in the center by executing the ALC control.

In the same manner, the driver moves the own vehicle 10 from the lane 502b in the center to the right-most lane 502a (target lane 502tar) by requesting the ALC through the direction indicator 22 (point P14). When the vehicle 10 reaches a predetermined distance to the exit 506, the LKAS control finishes after notifying the driver. Then, the driver starts manually operating steering and acceleration/deceleration. The own vehicle 10 is moved from the right-most lane 502a toward the exit 506 by the driver's operation (point P15).

A-2-5-2. Flowchart of Lane Change Guidance Control

A-2-5-2-1. Overall Flow of Lane Change Guidance Control

Figure 4:
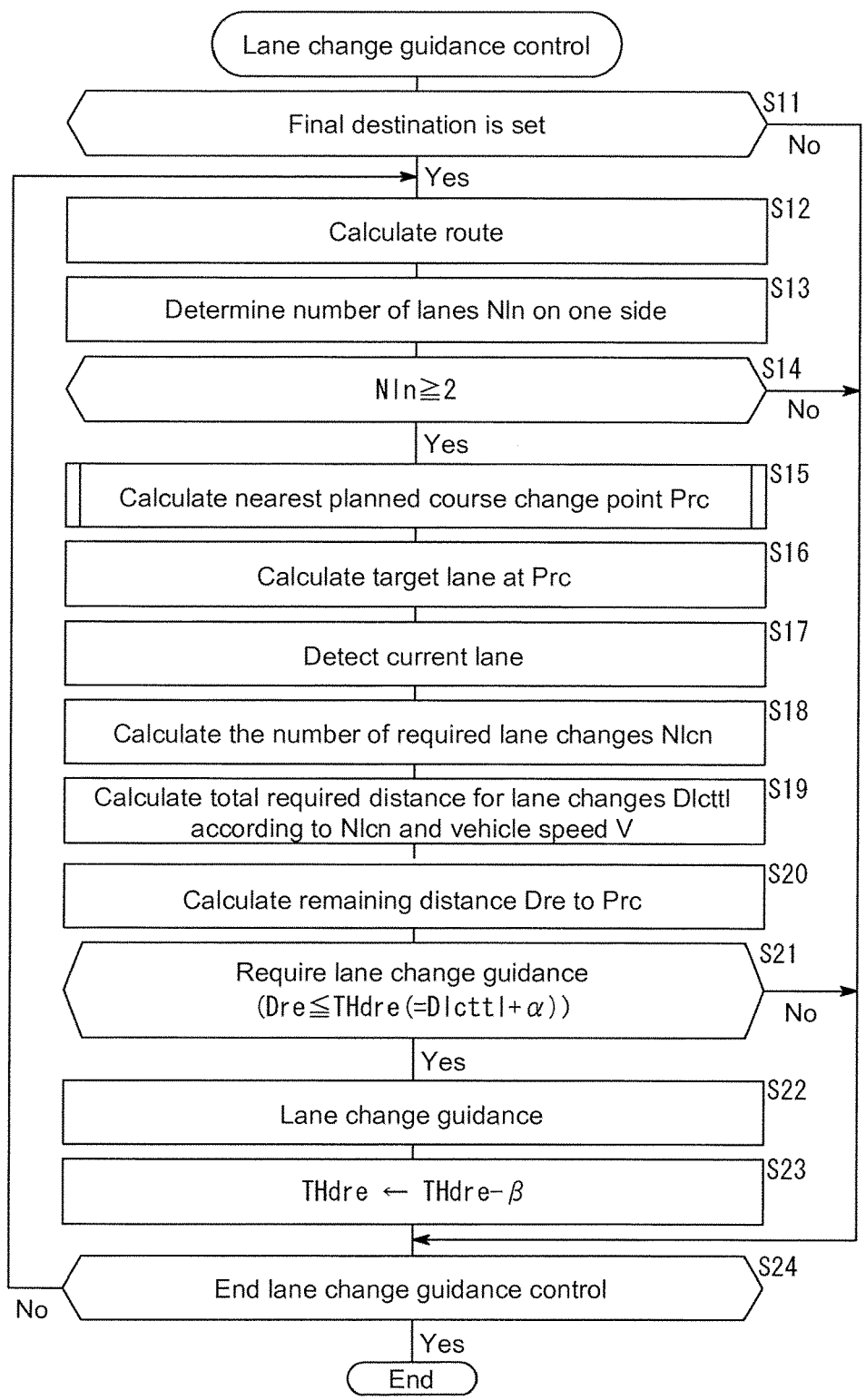
FIG. 4 is a flowchart of the lane change guidance control of the embodiment.

FIG. 4 is a flowchart of the lane change guidance control of this embodiment. The lane change guidance control of FIG. 4 is executed by the arithmetic part 86 of the route guidance apparatus 12. Specifically, step S11 is executed by the route calculation part 100. Steps S12 and S17 are executed by the current lane calculation part 110. Steps S13 to S16 are executed by the target lane calculation part 112. Steps S18 and S19 are executed by the total required distance calculation part 114. Step S20 is executed by the remaining distance calculation part 116. Steps S21 and S23 are executed by the timing determination part 118. Step S22 is executed by the timing guidance part 120.

In step S11 of FIG. 4, the route guidance apparatus 12 determines whether the final destination Pgoal is set or not. If the final destination Pgoal is set (S11: YES), the process proceeds to step S12. If the final destination Pgoal is not set (S11: NO), the process proceeds to step S24.

If the planned route Rv of the vehicle 10 can be specified, the setting of the final destination Pgoal may not be necessary. For example, step S11 may be YES when it is set to repeatedly drive a circular route.

In step S12, the route guidance apparatus 12 calculates the route Rv based on the current position Pcur of the vehicle 10 and the final destination Pgoal. If the vehicle 10 deviates from the route Rv after calculating the route Rv, the route guidance apparatus 12 re-calculates the route Rv.

In step S13, the route guidance apparatus 12 determines the number of lanes Nln on the side the own vehicle 10 is travelling (on one side). For example, the route guidance apparatus 12 specifies the road (the express highway 500, etc.) corresponding to the current position Pcur of the own vehicle 10, and reads out or obtains the number of lanes Nln of the road from the map DB 122.

In step S14, the route guidance apparatus 12 determines whether the number of lanes Nln is greater than or equal to 2 or not (in other words, whether there are multiple lanes 502 on one side). If the number of lanes Nln is greater than or equal to 2 (S14: YES), the process proceeds to step S15. If the number of lanes Nln is not greater than or equal to 2 (that is, the number of lanes Nln is 1) (S14: NO), the process proceeds to step S24.

In step S15, the route guidance apparatus 12 calculates the nearest planned course change point Prc. The planned course change point Prc is a branch point (or a node) where the vehicle 10 needs to change the course (travelling road), and also can be said as a temporary destination as oppose to the final destination Pgoal. The planned course change point Prc includes one or more of the followings:

The exit 506 (or the entrance of the exit lane 502d) of the express highway 500 in an interchange where the vehicle 10 should get off:

A junction or a branch where the express highway 500a is divided into multiple roads.

An intersection where the vehicle 10 should make a turn.

In step S16, the route guidance apparatus 12 calculates the target lane 502tar at the nearest planned course change point Prc. The target lane 502tar means the lane to which the vehicle 10 should move before reaching the nearest planned course change point Prc.

In step S17, the route guidance apparatus 12 detects the current lane 502cur on the express highway 500. In this embodiment, the current lane 502cur is specified by counting the number of lane changes Nlc after entering the express highway 500, etc. The detection method of the current lane 502cur is described later with referring to FIGS. 6 and 7.

In step S18, the route guidance apparatus 12 calculates the number of required lane changes Nlcn required for moving to the target lane 502tar from the current lane 502cur. In FIG. 3, the number of required lane changes Nlcn required for moving to the target lane 502tar (lane 502a) from the current lane 502cur (lane 502c) at the point P11 is 2.

In step S19, the route guidance apparatus 12 calculates the total required distance for lane changes Dlcttl (hereinafter also referred to as "total required distance Dlcttl") according to the number of required lane changes Nlcn and the vehicle speed V. The total required distance for lane changes Dlcttl is a distance required for changing the lane from the current lane 502cur to the target lane 502tar. The "distance required for changing the lane from the current lane 502cur to the target lane 502tar" here may be defined as either one of a distance including a margin and a distance not including a margin.

The route guidance apparatus 12, for example, calculates the total required distance for lane changes Dlcttl by the following formula (1).

$$Dlcttl = Dlc \times Nlc \qquad (1)$$

In the above formula (1), Dlc is a distance required for a single lane change (required distance for a single lane change). Also, the required distance for a single lane change Dlc can be calculated by multiplying the period of time required for a single lane change Tlc by the vehicle speed V.

In this embodiment, the total required distance for lane changes Dlcttl is a fixed value corresponding to each combination of the number of required lane changes Nlcn and the vehicle speed V. Alternatively, the route guidance apparatus 12 may adjust the total required distance for lane changes Dlcttl by using the timing of the ALC start command from the driver.

In step S20, the route guidance apparatus 12 calculates the remaining distance Dre from the current position Pcur to the planned course change point Prc.

In step S21, the route guidance apparatus 12 determines whether the lane change guidance is required or not based on the total required distance for lane changes Dlcttl and the remaining distance Dre. In other words, the route guidance apparatus 12 determines the timing of the automated lane change corresponding to the operation of the direction indicator 22 by the driver based on the total required distance for lane changes Dlcttl and the remaining distance Dre.

Specifically, the route guidance apparatus 12 determines whether the remaining distance Dre is less than or equal to a distance threshold value THdre or not. The distance threshold value THdre is the sum of the total required distance for lane changes Dlcttl and a margin value α. If the total required distance for lane changes Dlcttl is set to include the margin value α in advance, the distance threshold value THdre may be regarded as the same as the total required distance for lane changes Dlcttl.

If the lane change guidance is required (S21: YES), the process proceeds to step S22. If the lane change guidance is not required (S21: NO), the process proceeds to step S24.

In a case where the driver changes the lane toward the target lane 502tar when the lane change guidance is not required (S21: NO), it can be regarded that the driver desires to make the margin value α greater. Then, the route guidance apparatus 12 may adjust the margin value α used from the next time to be greater. The execution of the lane change may be determined by using the operation to the steering 50, etc. instead of the operation to the direction indictor 22.

In step S22, the route guidance apparatus 12 performs the lane change guidance which guides the dining of the ALC. As mentioned above, the lane change guidance of this embodiment includes the audio guidance through the speaker 92 and the display guidance through the touch panel 90.

In step S23, the route guidance apparatus 12 set a difference calculated by subtracting a positive value β from the current distance threshold value THdre as the new distance threshold value THdre. Thereby, if the process reaches step S21 again while continuing the lane change guidance control, the lane change guidance can be performed again for the driver.

In step S24, the route guidance apparatus 12 determines whether to end the lane change guidance control or not. The determination is made by, for example, whether the completion flag indicating the completion of the ALC is set or not. To continue the lane change guidance control (S24: NO), the process moves back to step S12. To end the lane change guidance control (S24: YES), the present lane change guidance control is terminated.

A-2-5-2-2. Calculation of Nearest Planned Course Change Point Prc (S15 of FIG. 4)

Figure 5:
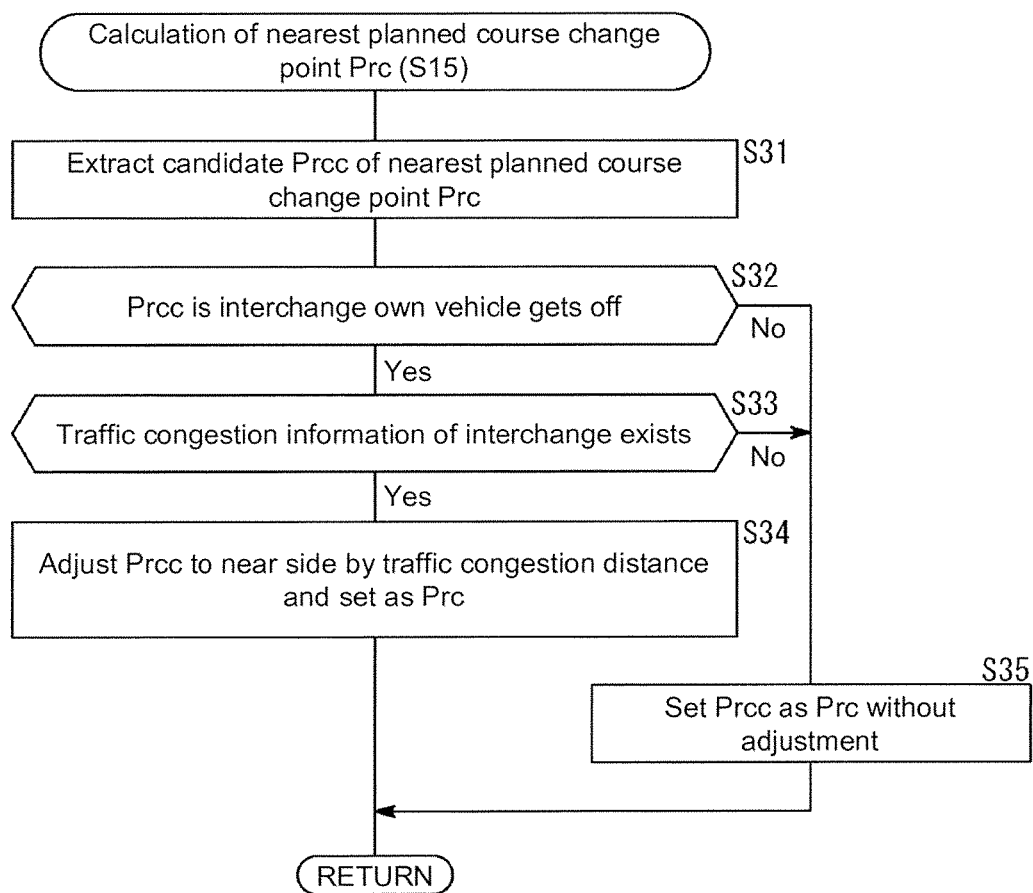
FIG. 5 is a flowchart for calculating the nearest planned course change point in the embodiment.

FIG. 5 is a flowchart for calculating the nearest planned course change point Prc in this embodiment. In step S31, the route guidance apparatus 12 extracts a candidate Prcc of the nearest planned course change point Prc based on the current position Pcur and the planned route Rv. For example, the route guidance apparatus 12 searches a location which can be the planned course change point Prc from the current position Pcur to the final destination Pgoal. If such a location is found, it is extracted as the candidate Prcc.

In step S32, the route guidance apparatus 12 determines whether the candidate Prcc is the exit of the express highway 500 (main stem) in the interchange where the own vehicle 10 should get off or not. If the candidate Prcc is the exit of the express highway 500 (S32: YES), the route guidance apparatus 12 obtains the traffic congestion information Ijam from the traffic information server 300 through the communication part 82 in step S33. Then, the route guidance apparatus 12 determines whether there is traffic congestion distance information Ijd in the traffic congestion information Ijam regarding the interchange which is the candidate Prcc or not.

If there exists the traffic congestion distance information Ijd (S33: YES), the candidate Prcc is adjusted to the near side by a traffic congestion distance Djam and set as the planned course change position Prc in step S34.

If the candidate Prcc is not the exit of the express highway 500 in the interchange where the own vehicle 10 should get off (S33: NO), or if the traffic congestion distance information Ijd does not exist (S33: NO), the route guidance apparatus 12 sets the candidate Prcc as the planned course change point Prc without making any adjustment in step S35.

A-2-5-2-3. Detection of Current Lane 502cur (S17 of FIG. 4)

A-2-5-2-3-1. Overview of Current lane 502cur (Lane Attribute Pln)

Figure 6:
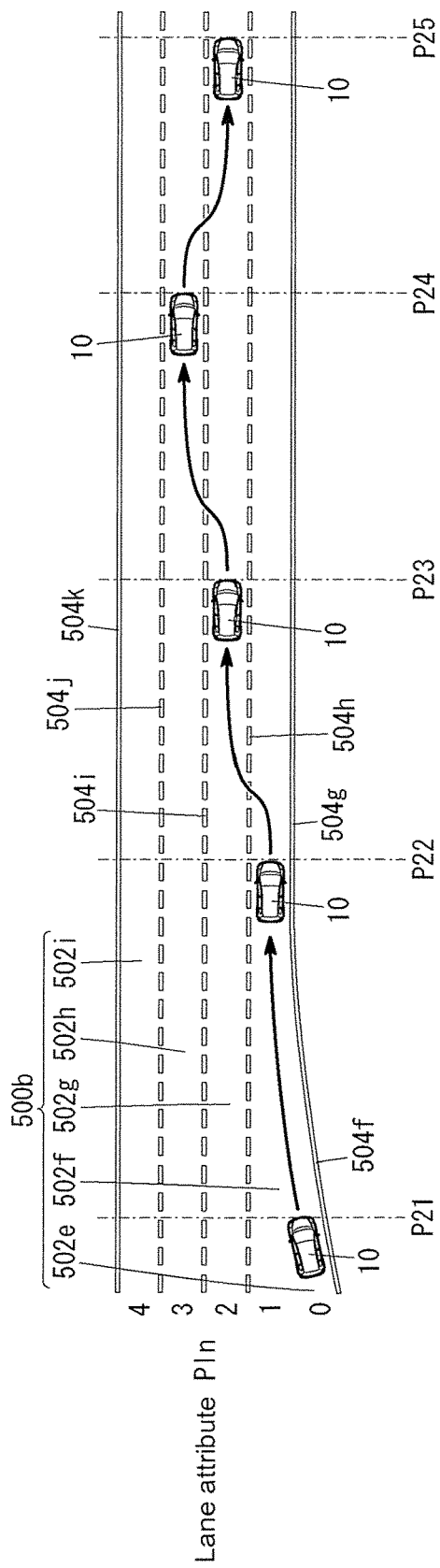
FIG. 6 is a diagram for describing detection of the current lane involved with the lane change of the vehicle.

FIG. 6 is a diagram for describing detection of the current lane 502cur involved with the lane change of the vehicle 10. The express highway 500b includes the acceleration lane 502e and the four main stem lanes 502f, 502g, 502h and 502i on one side.

The lanes 502e, 502f, 502g, 502h and 502i are defined by the lane marks 504f, 504g, 504h, 504i, 504j and 504k. However, in FIG. 6, there is no lane mark 504 at the merge point of the acceleration lane 502e and the main stem lane 502f. Also, the lane mark 504f defining the right edge of the acceleration lane 502e and the lane mark 504h defining the right edge of the main stem lane 502f forms a continuous mark.

The own vehicle 10 enters the main stein lane 502f (nearest to the acceleration lane 502e (right-most side here)) (point P22) from the acceleration lane 502e (point P21). Then, the own vehicle 10 moves to the lane 502g which is second from the right (point P23), the lane 502h which is second from the left (point P24), and then the lane 502g which is second from the right (point P25) one by one.

As mentioned above, the map DB 122 stores the number of lanes Nln of each road combined with the location information of the road as the road information Ird. Therefore, the route guidance apparatus 12 can specify the number of lanes Nln of the road (express highway 500, etc.) corresponding to the current position Pcur of the own vehicle 10.

As shown in FIG. 6, a lane attribute Pln is assigned to each of the lanes 502e to 502i. Specifically, the lane attribute 0 is assigned to the accelerating lane 502e, and the lane attributes 1 to 4 are assigned respectively to the main stem lanes 502f to 502i.

The detection accuracy of the GPS sensor 84 of this embodiment is a level including errors of tens of centimeters. Therefore, if the current position Pcur detected by the GPS sensor 84 is used, the approximate position of the own vehicle 10 can be detected, but there is a case where the accuracy is not enough to determine which lane 502 the own vehicle 10 is travelling. Thus, this embodiment improves the accuracy by using the front camera 130.

Specifically, when the front image Icf from the front camera 130 is used, the route guidance apparatus 12 detects the lane mark 504 based on the front image Icf of the vehicle 10 captured by the front camera 130. Then, the route guidance apparatus 12 detects the existence and the type (the solid line, the dashed line, etc.) of the lane mark 504 constituting the lane 502.

Thereby, when travelling on the acceleration lane 502e, the route guidance apparatus 12 can detect that the own vehicle 10 is travelling on the acceleration lane 502e based on the current position Pcur and the road information Ird.

In addition, the route guidance apparatus 12 can determine that the acceleration lane 502e continues based on the front image Icf. That is, FIG. 6 does not show fully, but there exist the lane mark 504f and an undepicted lane mark, both of which are of the solid line, on the sides of the acceleration lane 502e. Therefore, the GPS sensor 84 determines that the acceleration lane 502e continues if the lane marks 504 on both sides of the travelling lane 502dr of the own vehicle 10 are the solid line.

Also, the route guidance apparatus 12 determines that the own vehicle 10 entered the main stem lane 502mn (lane 502f, which is closest to the acceleration lane) from the acceleration lane 502e based on the front image Icf. Specifically, as shown in FIG. 6, there is no lane mark 504 at the merge point of the acceleration lane 502e and the main stem lane 502f. Also, the main stem lane 502f (closest to the acceleration lane 502e) has the lane mark 504g of the solid line on the acceleration lane 502e side (right side of the own vehicle 10 in FIG. 6) and the lane mark 504h of the dashed line on the other side.

Accordingly, the route guidance apparatus 12 determines that the own vehicle 10 entered the main stein lane 502mn when detecting that the current position Pcur of the own vehicle 10 is within the main stem (lanes 502f to 502i) and, in addition, that the lane mark 504g adjacent to the acceleration lane 502e is the solid line and the lane mark 504h on the other side is the dashed line. Then, the route guidance apparatus 12 changes the lane attribute Pln from 0 to 1. In other words, the route guidance apparatus 12 sets the initial value of the current lane 502cur on a new road such as the express highway 500, etc. when detecting the lane mark 504 of the solid line on one side either right or left of the vehicle 10 and the lane mark 504 of the dashed line on the other side from the front image Icf.

Next, the route guidance apparatus 12 counts the number of lane changes Nlc after entering the express highway 500 based on the direction on which the vehicle 10 crosses the lane mark 504 and the number of times the vehicle 10 crosses the lane mark 504. For example, when the own vehicle 10 moved from the right-most main stem lane 502f to the main stem lane 504g on the left (from the point P22 to the point P23 in FIG. 6), the route guidance apparatus 12 detects that the own vehicle 10 performed the lane change on the direction toward the left based on the front image Icf. Therefore, the route guidance apparatus 12 changes the current lane attribute Pln from "1" to "2" by adding 1.

At that time, the route guidance apparatus 12 may confirm that the lane attribute Pln of the travelling lane 502dr is 2 by the fact that both the lane marks 504h and 504i on the left and right of the own vehicle 10 are of the dashed line. That is, it is possible to determine that the lane attribute Pln is incorrect if one of the lane marks 504 on the left and right is of the solid line even the lane attribute became 2.

Similarly, when the own vehicle 10 moved from the main stem lane 502g, which is second from the right, to the main stem lane 504h on the left (from the point P23 to the point P24 in FIG. 6), the route guidance apparatus 12 detects that the own vehicle 10 performed the lane change on the direction toward the left based on the front image Icf. Therefore, the route guidance apparatus 12 changes the current lane attribute Pln from "2" to "3" by adding 1.

At that time, the route guidance apparatus 12 may confirm that that the lane attribute Pln of the travelling lane 502dr is 3 by the fact that both the lane marks 504i and 504j on the left and right of the own vehicle 10 are of the dashed line. That is, it is possible to determine that the lane attribute Pln is incorrect if one of the lane marks 504 on the left and right is of the solid line even the lane attribute became 3.

Similarly, when the own vehicle 10 moved from the main stem lane 502h, which is second from the left, to the main stem lane 504g on the right (from the point P24 to the point P25 in FIG. 6), the route guidance apparatus 12 detects that the own vehicle 10 performed the lane change on the direction toward the right based on the front image Icf. Therefore, the route guidance apparatus 12 changes the current lane attribute Pln from "3" to "2" by subtracting 1.

At that time, the route guidance apparatus 12 may confirm that that the lane attribute Pln of the travelling lane 502dr is 2 by the fact that both the lane marks 504h and 504i on the left and right of the own vehicle 10 are of the dashed line. That is, it is possible to determine that the lane attribute Pln is incorrect if one of the lane marks 504 on the left and right is of the solid line even the lane attribute became 2.

A-2-5-2-3-2. Details of Lane Attribute Pln

FIG. 7 is an explanatory diagram of the relationship between the lane attribute Pln and other information in this embodiment. FIG. 7 shows the relationship of the number of lanes Nln of the road such as the express highway 500, the lane mark information Ilm, the number of lane changes Nlc, the lane attribute Pln and the points P22 to P25 in FIG. 6.

The number of lanes stored in the map DB 122 is used as the number of lanes Nln. The lane mark information Ilm is information regarding the type of the lane marks 504 existing on the left and right of the own vehicle 10 (in other words, defining the travelling lane of the own vehicle 10) detected based on the front image Icf. The lane mark information Ilm of this embodiment is "0" for the dashed line and "1" for the solid line. Alternatively, it is also possible to further subdivide the type of the lane mark 504 (for example, distinction by color).

The number of lane changes Nlc indicates the number of lane changes with reference to the acceleration lane 502e. For example, in the examples of FIGS. 6 and 7, since the acceleration lane 502e is on the right side of the main stein lane 502mn, 1 is added to the number of lane changes Nlc in accordance with moving to the lane 502 on the left side, and 1 is subtracted from the number of lane changes Nlc in accordance with moving to the lane 502 on the right side. The number of lane changes Nlc can be counted based on the number of times it is determined that the lane mark 504 is crossed based on the front image Icf. Alternatively, the number of lane changes Nlc can be counted according to the operation of the direction indicator 22. Alternatively, in the case of the automated driving, which is described later, the number of lane changes Nlc can be counted based on a lane change start signal and a lane change completion signal.

The lane attribute Pln indicates each of the lanes 502 constituting the road such as the express highway 500. In the example of FIG. 6, a number is assigned to each of the lanes 502 from the lane 502f which is closest to the acceleration lane 502e in series.

Figure 8A:
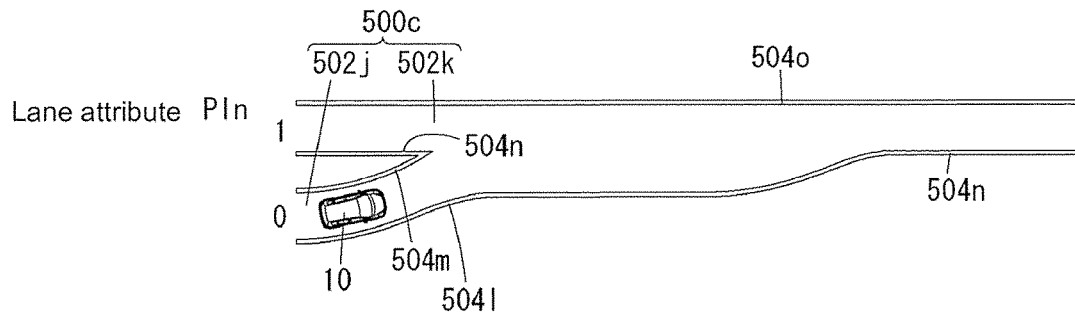
FIG. 8A is a diagram illustrating a merge point where the number of lanes on the main stem is one.

FIG. 8A is a diagram illustrating a merge point where the number of lanes Nln on the main stem is one. The express highway 500c of FIG. 8A includes the acceleration lane 502j and the main stem lane 502k. The acceleration lane 502j is defined by the lane marks 504l and 504m. The main stem lane 502k is defined by the lane marks 504n and 504o.

Figure 8B:
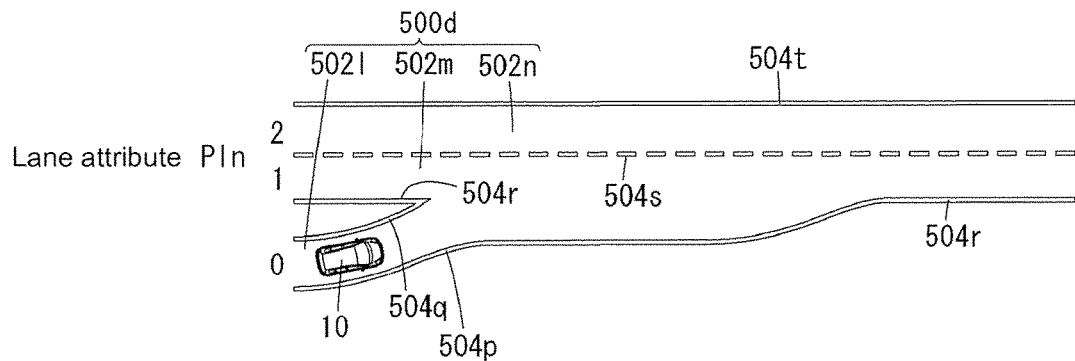
FIG. 8B is a diagram illustrating a merge point where the number of lanes on the main stem is two.

FIG. 8B is a diagram illustrating a merge point where the number of lanes Nln on the main stem is two. The express highway 500d of FIG. 8B includes the acceleration lane 502l and the main stem lanes 502m and 502n. The acceleration lane 502l is defined by the lane marks 504p and 504q. The main stem lanes 502m and 502n are defined by the lane marks 504r, 504s and 504t.

Figure 8C:
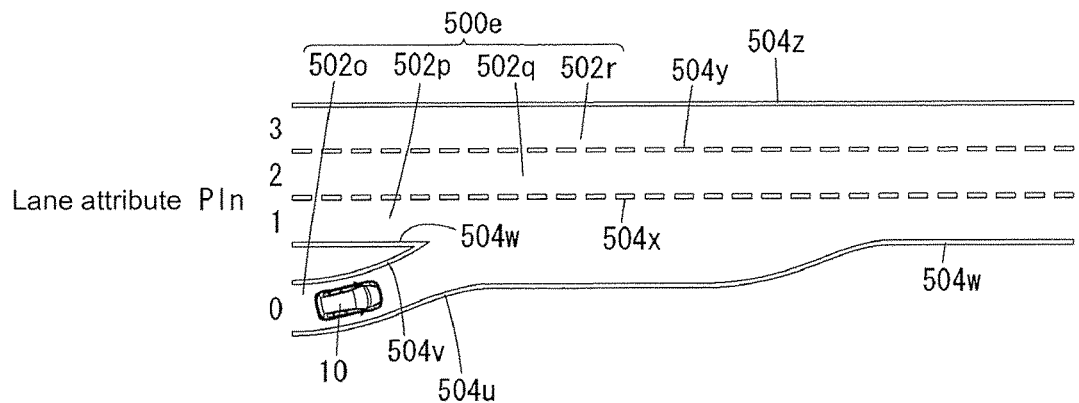
FIG. 8C is a diagram illustrating a merge point where the number of lanes on the main stem is three.

FIG. 8C is a diagram illustrating a merge point where the number of lanes Nln on the main stem is three. The express highway 500e of FIG. 8C includes the acceleration lane 502o and the main stem lanes 502p, 502q and 502r. The acceleration lane 502o is defined by the lane marks 504u and 504v. The main stem lanes 502p, 502q and 502r are defined by the lane marks 504w, 504x, 504y and 504z.

FIG. 7 shows the cases where the number of lanes Nln is 1, 2, 3 and 4. As shown in FIG. 8A, when the number of lanes Nln is 1, the lane marks 504 on both sides of the main stem lane 502mn are of the solid line. Therefore, when the own vehicle 10 moves from the acceleration lane 502j to the main stem lane 502k, the lane mark 504n of the main stem lane 502k appears once the lane mark 504 between the acceleration lane 502j and the main stern lane 502k disappeared. In this case, the lane attribute Pln of the main stem lane 502k is constantly 1.

As shown in FIG. 8B, when the number of lanes Nln is 2, the lane 502m, which is closer to the acceleration lane 502l between the main stem lanes 502m and 502n, has the lane mark 504r of the solid line on the acceleration lane 502l side and the lane mark 504s of the dashed line on the other side. The lane 502n on the opposite side to the acceleration lane 502l has the lane mark 504s of the dashed line on the acceleration lane 502l side and the lane mark 504t of the solid line on the other side.

Therefore, it is possible for the route guidance apparatus 12 to distinguish the main stein lanes 502mn by using the type (solid line/dashed line) of the lane marks 504 of each of the main stem lanes 502mn. The lane attribute Pln of the lane 502m on the right side on the travelling direction of the own vehicle 10 is 1, and the lane attribute Pln of the lane 502n on the left side is 2.

As shown in FIG. 8C, when the number of lanes Nln is 3, the lane 502p, which is closest to the acceleration lane 502o among the main stem lanes 502p, 502q and 502r, has the lane mark 504w of the solid line on the acceleration lane 502o side and the lane mark 504x of the dashed line on the other side. The center lane 502q has the lane mark 504x on the acceleration lane 502o side and the lane mark 504y on the other side, both of which are of the dashed line. The lane 502r which is the farthest from the acceleration lane 502o has the lane mark 504y of the dashed line on the acceleration lane 502o side and the lane mark 504z of the solid line on the other side.

Therefore, it is possible for the route guidance apparatus 12 to distinguish the main stem lanes 502p, 502q and 502r by using the type (solid line/dashed line) of the lane marks 504 of each of the main stem lanes 502p, 502q and 502r. The lane attribute Pln of the lane 502p on the right side on the travelling direction of the own vehicle 10 is 1, and the lane attribute Pln of the center lane 502q is 2, and the lane attribute Pln of the lane 502r on the left side is 3.

The case where the number of lanes Nln is 4 has already been described by referring to FIG. 6. For a case where the number of lanes Nln is greater than or equal to 5, the route guidance apparatus 12 can determine the lane attribute Pln in the same manner as described above.

Accordingly, the route guidance apparatus 12 can determine the lane attribute Pln for any number of lanes Nln.

A-3. Effects if the Embodiment

As described above, according to this embodiment, the timing of the automated lane change (ALC) is determined based on the total required distance Dlcttl corresponding to the number of lane changes Nlcn required for reaching the target lane 502tar from the current lane 502cur and the remaining distance Dre to the planned course change point Prc from the current position Pcur (S21 of FIGS. 3 and 4). Then, when the timing of the ALC is reached (S21: YES), the timing of the ALC is guided (S22).

Thereby, the timing of the ALC is guided at the timing calculated back from the total required distance Dlcttl. Accordingly, it is possible to travel with relatively a few restrictions compared to the case where the vehicle is guided to travel on the target lane 502tar from the beginning, for example. Therefore, it is possible to improve the degree of freedom under travelling of the vehicle 10 and to appropriately perform the route guidance.

Also, if the timing of the ALC is not guided at all, it may not be able to smoothly travel when the driver tries to move to the target lane 502tar right before reaching the planned course change point Prc. According to this embodiment, the driver can smoothly reach the target lane 502tar before reaching the planned course change point Prc by the guidance of the timing of the ALC.

In this embodiment, the current lane calculation part 110 (refer to FIG. 2) obtains the number of lanes Nln of the express highway 500 (first road) corresponding to the current position Pcur from the map DB 122 (S13 of FIG. 4). Also, the current lane calculation part 110 specifies the current lane 502cur by counting the number of lane changes Nlc after entering the express highway 500 (S17 of FIG. 4 and FIGS. 6 and 7).

Thereby, it is possible to specify the current lane 502cur even it cannot be detected which lane 502 the vehicle 10 is travelling on based on the current position Pcur because of relatively low detection accuracy of the current position Pcur.

In this embodiment, the current lane calculation part 110 detects the lane mark 504 based on the front image Icf of the vehicle 10 captured by the front camera 130. Then, the current lane calculation part 110 counts the number of lane changes Nlc after entering the express highway 500 (first road) based on the direction on which the vehicle 10 crossed the lane mark 504 and the number of times the vehicle 10 crossed the lane mark 504 (S17 of FIG. 4 and FIGS. 6 and 7).

Thereby, it is possible to specify the current lane 502cur with relatively high accuracy by using the front image Icf even it cannot be detected which lane 502 the vehicle 10 is travelling on based on the current position Pcur because of relatively low detection accuracy of the current position Pcur.

In this embodiment, the current lane calculation part 110 sets the initial value of the current lane 502cur on the express highway 500 (first road) when detecting the lane mark 504 of the solid line on either the left or right side of the vehicle 10 (FIG. 6 and FIGS. 8A to 8C) and the lane mark 504 of the dashed line on the other side from the front image Icf (S17 of FIG. 4, and FIGS. 6 and 7). Thereby, it is possible to determine the start point of the express highway 500 in a relatively simple way.

In this embodiment, the remaining distance calculation part 116 sets the planned course change point Prc at the exit 506 (or the exit lane 502d) of the express highway 500 (first road) in the interchange where the vehicle 10 should get off, a junction or a branch where the express highway 500 is divided into multiple roads, or an intersection where the vehicle 10 should make a turn (S15 of FIG. 4). Thereby, it is possible to smoothly perform prerequisite lane change when the vehicle 10 changes the lane at the interchange, the junction, the branch or the intersection.

In this embodiment, the remaining distance calculation part 116 sets the planned course change point Prc at the exit of the express highway 500 in the interchange where the vehicle 10 should get off (S15 of FIGS. 3 and 4). Further, the remaining distance calculation part 116 adjusts the planned course change point Prc to the near side by using traffic congestion distance information Ijd at the interchange obtained from traffic information server 300 through the communication part 82 (S34 of FIG. 5). Thereby, even there is traffic congestion at the interchange where the vehicle 10 should get off, it makes easier to perform the lane change to the target lane 502*tar* according to the traffic congestion.

B. Variations

The present invention is not limited to the embodiment described above, and it is possible to adopt various configurations based on the contents of the disclosure. For example, the following configurations may be adopted.

B-1. Applicable Subjects

In the above embodiment, the route guidance apparatus 12 is applied to the vehicle 10 (refer to FIG. 1). However, it is not limited thereto, and the route guidance apparatus 12 may be applied to other moving objects from the aspect of, for example, guiding the timing of the automated lane change (ALC) (or the automated course change) or the manual lane change (or the manual course change) by the manual operation, or performing the ALC automatically. For example, the route guidance apparatus 12 may be applied to ships or robots.

B-2. Configuration of Travelling Support Apparatus 14

In the above embodiment, the radars 134*l* and 134*r* (the radar information Ir) are used to detect the object 200 on the left and right sides in the rear (refer to FIG. 1). However, it is not limited thereto from the aspect of, for example, detecting the surrounding object 200 (refer to FIG. 1). For example, side cameras and/or a rear camera capturing images on the left and right sides in the rear may be used for detecting the object 200.

In the above embodiment, the LKAS control part 164, the ALC control part 166 and the switching control part 168 are included in the single travelling support ECU 138 (refer to FIG. 2). However, it is not limited thereto from the aspect of, for example, guiding the timing of the ALC by the manual operation or the manual lane change, or performing the ALC automatically. For example, the LKAS control part 164, the ALC control part 166 and the switching control part 168 may be included respectively in separate electronic control units (ECUs).

B-3. Control of Route Guidance Apparatus 12

B-3-1. Applicable Cases

The above embodiment shows examples of route guidance on the express highway 500 (FIGS. 3, 6 and 8A to 8C). However, the lane change guidance control of FIG. 4 is applicable to other roads other than the express highway 500 (general roads, for example). Alternatively, the lane change guidance control may be performed only on the express highway 500. In this case, it may be determined whether the own vehicle 10 is travelling on the express highway 500 or not, instead of steps S13 and S14 of FIG. 4.

B-3-2. Method for Route Guidance

In the above embodiment, an example of guiding the timing of the ALC instructed manually is described as the route guidance of the route guidance apparatus 12 (S22 of FIGS. 3 and 4). However, it is not limited thereto from the aspect of using the timing of the ACL determined based on the total required distance Dlcttl and the remaining distance Dre or of the manual lane change, for example. The present invention may be applicable to a configuration that the vehicle 10 (not the driver) automatically determines the start of the ALC, for example. Alternatively, the present invention may be applicable to a configuration guiding the timing of the manual lane change which the driver operates steering. The configuration for guiding the timing of the manual lane change may omit a part of or all of the front radar 132 and the side radars 134*l* and 134*r*.

Figure 9:
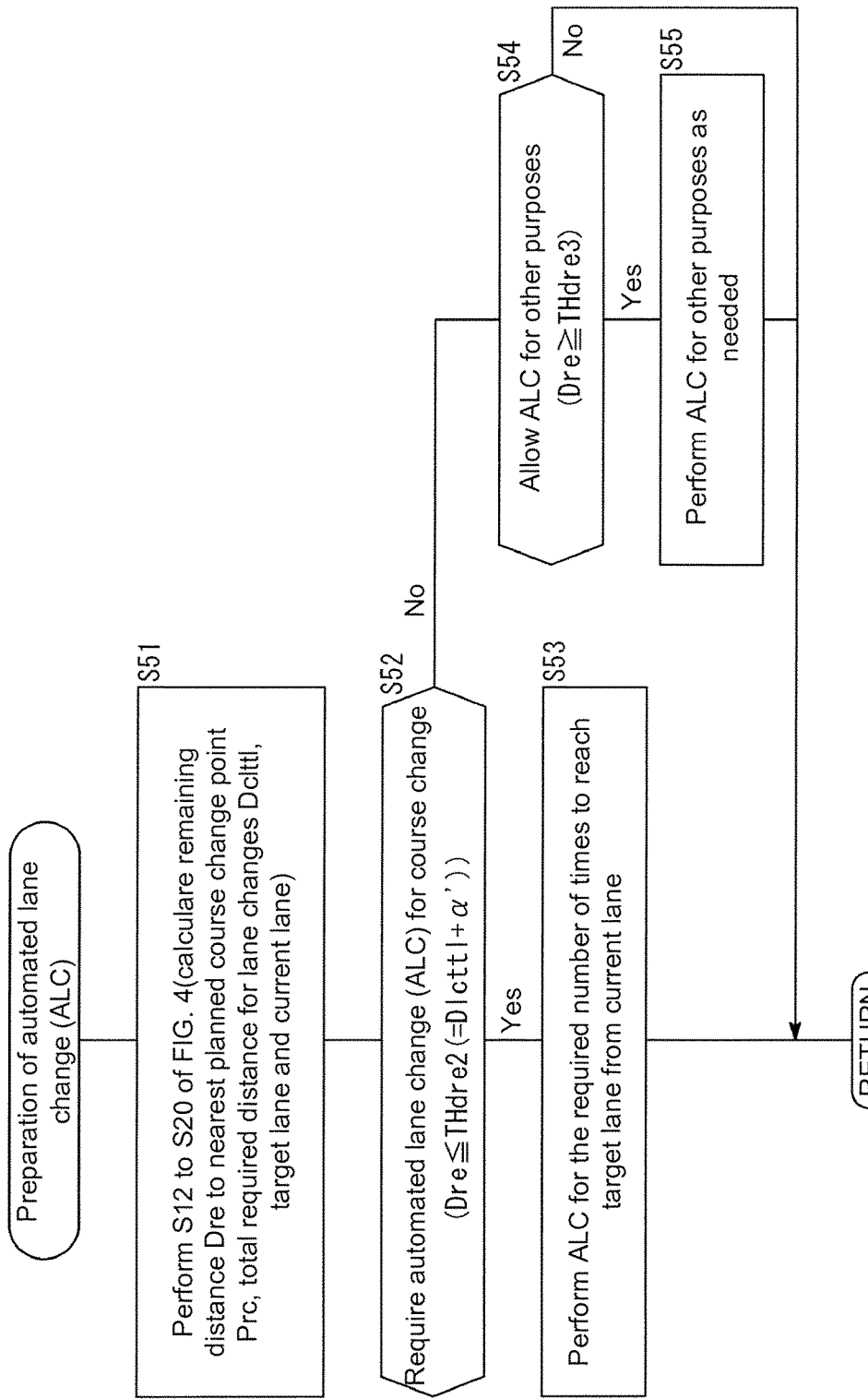
FIG. 9 is a flowchart of the automated lane change (ALC) control according to a variation.

FIG. 9 is a flowchart of the automated lane change (ALC) control according to a variation. The ALC control of FIG. 9 is used for the configuration which the vehicle 10 (not the driver) automatically determines the start of the ALC. The final destination Pgoal of the vehicle 10 has already been set by the time starting the ALC control. In other words, step S11 of FIG. 4 is YES at the time starting the ALC control.

In step S51 of FIG. 9, the route guidance apparatus 12 performs steps S12 to S20 of FIG. 4. Thereby, the route guidance apparatus 12 calculates the remaining distance Dre to the nearest planned course change point Prc, the total required distance for lane changes Dlcttl, the target lane 502*tar* and the current lane 502*cur*.

In step S52, the route guidance apparatus 12 determined whether the ALC for a course change is required or not. This determines whether the remaining distance Dre is less than or equal to a distance threshold value THdre2 or not. The distance threshold value THdre2 is the sum of the total required distance for lane changes Dlcttl and a margin value α'. The margin value α' may be either the same value as or a different value to the margin value α of step S21 of FIG. 4. If the total required distance Dlcttl is configured to include the margin value α', the distance threshold value THdre2 may be the same as the total required distance Dlcttl.

If the ALC for a course change is required (S52: YES), in step S53, the route guidance apparatus 12 performs the ALC for the number of times equivalent to the number of required lane changes Nlcn (the number of times equivalent to the number of lane changes required for reaching the target lane 502*tar* from the current lane 502*cur*) calculated in step S51. For example, under a situation that is the same as FIG. 3, the route guidance apparatus 12 performs the ALC twice. Then, the route guidance apparatus 12 makes the vehicle 10 enter the exit 506 of the express highway 500.

If the lane mark 504 on the lane change direction (right side direction in the case of FIG. 3, for example) before performing the lane changes for the number of required lane changes Nlc, the route guidance apparatus 12 determines that the target lane 502*tar* is reached. It can be assumed that no more lanes 502 exist on the lane change direction if the lane mark 504 on the lane change direction is of the solid line.

If the ALC for a course change is not required (S52: NO), in step S54, the route guidance apparatus 12 determines whether to allow the ALC for other purposes other than the course change or not. Specifically, the route guidance apparatus 12 determines whether the remaining distance Dre to the planned course change point Prc from the current position Pcur is greater than or equal to a distance threshold value THdre3.

The distance threshold value THdre3 is a threshold value for determining whether the ALC (S53) for the course change can be completed in time or not. The distance threshold value THdre3 may be a fixed value or a variable value. If the distance threshold value THdre3 is a variable value, the distance threshold value THdre3 is adjusted according to the number of required lane changes Nlc, for example.

The ALC for other purposes includes the ALC for overtaking the preceding vehicle travelling on the same lane 502.

If the ALC for other purposes is allowed (S54: YES), in step S55, the route guidance apparatus 12 performs the ALC for other purposes as needed. If the ALC for other purposes is not allowed (S54: NO), travelling on the target lane 502tar or another lane 502 is maintained. In this case, the ALC control in this time is ended and the process returns to step S51 after a predetermined period of time has passed.

According to the above variation (FIG. 9), the following effects can be obtained in addition to or instead of the effects of the embodiment.

According to the variation, the timing of the ALC is determined based on the total required distance Dlcttl corresponding to the number of required lane changes Nlc required for reaching the target lane 502tar from the current lane 502cur, and the remaining distance Dre to the planned course change point Prc from the current position Pcur (S52 of FIG. 9). Then, the ALC is performed when the timing of the ALC is reached (S53).

Thereby, the ALC is performed at the timing calculated back from the total required distance Dlcttl. Accordingly, it is possible to travel with relatively a few restrictions compared to the case where the vehicle 10 is guided to travel on the target lane 502tar from the beginning. Therefore, it is possible to improve the degree of freedom under travelling of the vehicle 10 and to appropriately perform the route guidance.

B-3-3. Detection of Planned Course Change Point Prc (S15 of FIG. 4)

The embodiment described above obtains the traffic information (traffic congestion distance information Ijd, etc.) from the traffic information server 300 (refer to FIG. 1). However, it is not limited thereto from the aspect of, for example, obtaining the traffic congestion distance information Ijd. For example, it is possible to obtain the traffic congestion distance information Ijd by receiving a broadcast wave transmitted through a broadcast antenna of a broadcasting station.

The traffic congestion distance information Ijd of the above embodiment is regarding the interchange (S33 of FIG. 5). However, it is not limited thereto from the aspect of, for example, adjusting the candidate Prcc to the near side by the traffic congestion distance Djam and setting the adjusted candidate Prcc as the planned course change point Prc. For example, the traffic congestion distance information Ijd may be regarding an intersection, etc.

In the above embodiment, the planned course change point Prc is adjusted based on the traffic congestion distance information Ijd (S34 of FIG. 5). However, it is not limited thereto from the aspect of, for example, guiding the timing of the manually operated ALC or the manual lane change or operating the ALC automatically. For example, a configuration without using the traffic congestion distance information Ijd is also possible.

B-3-4. Detection of Current Lane 502cur (S17 of FIG. 4, and FIGS. 6 and 7)

In the above embodiment, the number of lane changes Nlc is calculated based on the front image Icf from the front camera 130 (S17 of FIG. 4, and FIGS. 6 and 7). However, it is not limited thereto from the aspect of, for example, detecting the number of lane changes Nlc. For example, the number of lane changes Nlc may be calculated based on the operation to the direction indicator 22 and the moving distance on the side direction.

In the above embodiment, the current lane 502cur is detected based on the number of lane changes Nlc (S17 of FIG. 4, and FIGS. 6 and 7). However, it is not limited thereto from the aspect of, for example, guiding the timing of the manually operated ALC or the manual lane change or operating the ALC automatically. For example, if the detection accuracy of the GPS sensor 84 is high and the map information Imap of the map information DB 122 is accurate, the current lane 502cur may be directly detected by comparing the current position Pcur detected by the GPS sensor 84 with the map information Imap.

B-3-5. Calculation of Number of Required Lane Changes Nlcn (S18 of FIG. 4)

In the above embodiment, the number of required lane changes Nlcn is calculated by using the current lane 502cur of the own vehicle 10 and the map information Imap of the map DB 122 (S18 of FIG. 4). However, it is not limited thereto from the aspect of, for example, calculating the number of required lane changes Nlcn.

For example, it is possible to calculate the number of required lane changes Nlcn based on the front image Icf from the front camera 130. Specifically, the view angle of the front camera 130 is made relatively wide so that all the multiple lanes 502 on one side of the road can be captured. Then, the number of required lane changes Nlcn is calculated by detecting or calculating the all the lanes 502 based on the front image Icf. Alternatively, the number of required lane changes Nlcn may be calculated by detecting or calculating all the lanes 502 based on images captured by side cameras or a rear camera (not depicted) in addition to or instead of the front camera 130.

B-3-6. Calculation of Total Required Distance for Lane Changes Dlcttl (S19 of FIG. 4)

In the above embodiment, the total required distance for lane changes Dlcttl is calculated based on the number of required lane changes Nlcn and the vehicle speed V (S19 of FIG. 4). However, it is not limited thereto from the aspect of, for example, calculating the total required distance for lane changes Dlcttl.

For example, the total required distance for lane changes Dlcttl corresponding to the vehicle speed V and the combination of the current lane 502cur and the target lane 502tar are made to be a map, and the total required distance for lane changes Dlcttl may be calculated by using the map. Thereby, it is possible to omit the calculation of the number of required lane changes Nlcn.

B-4. Control For Travelling Support ECU 138

The ALC control and the LKAS control in the above embodiment involve operations by the driver. However, it is not limited thereto from the aspect of, for example, guiding the timing of the manually operated ALC or the manual lane change or operating the ALC automatically. For example, the ALC control and the LKAS control (or the ACC) for the complete automated drive control may be used.

The examples of FIGS. 3, 6 and 8A to 8C assume the white line (the solid line and the dashed line) on the road as the lane mark 504. However, it is not limited thereto from the aspect of, for example, the lane mark 504 defining the travelling lane 502dr and the target lane 502tar. For example, the lane mark 504 may be a yellow line, botts dots or cat's eyes. Alternatively, the lane mark 504 may be a guardrail itself or a virtual lane mark set at a predetermined distance from the guardrail.

In the above embodiment, the LKAS reference position Plkas_ref and the ALC reference position Palc_ref are used. However, it is possible to use the LKAS reference position Plkas_ref and the ALC reference position Palc_ref as reference regions (target regions).

What is claimed is:

1. A route guidance apparatus that navigates a route of a vehicle to a destination for a manual driving or an automatic driving, comprising:
   a current lane detection part detecting a current lane on which the vehicle is travelling on a first road where a plurality of lanes exist on one side;
   a target lane calculation part calculating a target lane on which the vehicle should travel at a planned course change point that is a branch point where the vehicle changes a course;
   a total required distance calculation part calculating a total required distance corresponding to a number of required lane changes required for reaching the target lane from the current lane;
   a remaining distance calculation part calculating a remaining distance to the planned course change point from a current position of the vehicle;
   a timing determination part determining a timing of an automatic lane change or a manual lane change based on the total required distance and the remaining distance; and
   a lane change support part guiding the timing of the automatic lane change or the manual lane change or performing the automatic lane change when the timing of the automatic lane change or the manual lane change is reached.

2. The route guidance apparatus according to claim 1, wherein
   the current lane detection part obtains a number of lanes of the first road corresponding to the current position from a map information database, and specifies the current lane by counting a number of lane changes after entering the first road.

3. The route guidance apparatus according to claim 2, wherein
   the remaining distance calculation part sets the planned course change point to an exit of the first road in an interchange where the vehicle should get off, a junction or a branch where the first road is divided into a plurality of roads, or an intersection where the vehicle should make a turn.

4. The route guidance apparatus according to claim 2, wherein
   the remaining distance calculation part adjusts the planned course change point to a near side by using a traffic congestion distance information at the planned course change point obtained from an outside through a communication apparatus.

5. The route guidance apparatus according to claim 2, wherein
   the current lane detection part detects a lane mark based on a front image of the vehicle captured by a front camera, and counts the number of lane changes after entering the first road based on a direction on which the vehicle crosses the lane mark and a number of times the vehicle crosses the lane mark.

6. The route guidance apparatus according to claim 5, wherein
   the remaining distance calculation part sets the planned course change point to an exit of the first road in an interchange where the vehicle should get off, a junction or a branch where the first road is divided into a plurality of roads, or an intersection where the vehicle should make a turn.

7. The route guidance apparatus according to claim 5, wherein
   the current lane detection part sets an initial value of the current lane on the first road when the lane mark of a solid line on either a left side or a right side of the vehicle and the lane mark of a dashed line on another side are detected from the front image.

8. The route guidance apparatus according to claim 7, wherein
   the remaining distance calculation part sets the planned course change point to an exit of the first road in an interchange where the vehicle should get off, a junction or a branch where the first road is divided into a plurality of roads, or an intersection where the vehicle should make a turn.

9. The route guidance apparatus according to claim 7, wherein
   the remaining distance calculation part adjusts the planned course change point to a near side by using a traffic congestion distance information at the planned course change point obtained from an outside through a communication apparatus.

10. The route guidance apparatus according to claim 5, wherein
    the remaining distance calculation part adjusts the planned course change point to a near side by using a traffic congestion distance information at the planned course change point obtained from an outside through a communication apparatus.

11. The route guidance apparatus according to claim 1, wherein
    the remaining distance calculation part sets the planned course change point to an exit of the first road in an interchange where the vehicle should get off, a junction or a branch where the first road is divided into a plurality of roads, or an intersection where the vehicle should make a turn.

12. The route guidance apparatus according to claim 1, wherein
    the remaining distance calculation part adjusts the planned course change point to a near side by using a traffic congestion distance information at the planned course change point obtained from an outside through a communication apparatus.

13. A route guidance method for navigating a route of a vehicle to a destination by using a route guidance apparatus, wherein the route guidance apparatus performs:

a current lane detection step for detecting a current lane on which the vehicle is travelling on a first road where a plurality of lanes exist on one side;

a target lane calculation step for calculating a target lane on which the vehicle should be travelling at a planned course change point that is a branch point where the vehicle needs to change a course;

a total required distance calculation step for calculating a total required distance corresponding to a number of required lane changes for reaching the target lane from the current lane;

a remaining distance calculation step for calculating a remaining distance to the planned course change point from a current position of the vehicle;

a timing determination step for determining a timing of an automatic lane change or a manual lane change based on the total required distance and the remaining distance; and a lane change support step for guiding the timing of the automatic lane change or the manual lane change or performing the automatic lane change when the timing of the automatic lane change or the manual lane change is reached.

\* \* \* \* \*